(12) United States Patent
Beane

(10) Patent No.: US 9,944,353 B2
(45) Date of Patent: Apr. 17, 2018

(54) SYSTEM FOR PRODUCING ENERGY THROUGH THE ACTION OF WAVES

(71) Applicant: GWAVE LLC, Hanover, NH (US)

(72) Inventor: Glenn L. Beane, Hanover, NH (US)

(73) Assignee: GWAVE LLC, Hanover, NH (US)

( * ) Notice: Subject to any disclaimer, the term of this patent is extended or adjusted under 35 U.S.C. 154(b) by 0 days.

(21) Appl. No.: 13/909,258

(22) Filed: Jun. 4, 2013

(65) Prior Publication Data

US 2013/0319309 A1    Dec. 5, 2013

Related U.S. Application Data

(60) Provisional application No. 61/655,095, filed on Jun. 4, 2012.

(51) Int. Cl.

| | |
|---|---|
| F03B 13/14 | (2006.01) |
| F03B 13/16 | (2006.01) |
| B63B 1/02 | (2006.01) |
| B63B 1/04 | (2006.01) |
| B63B 39/00 | (2006.01) |
| B63B 1/10 | (2006.01) |
| B63B 21/50 | (2006.01) |
| B63B 35/44 | (2006.01) |
| B63B 21/16 | (2006.01) |
| B63B 1/12 | (2006.01) |

(52) U.S. Cl.
CPC ............... *B63B 1/04* (2013.01); *B63B 1/10* (2013.01); *B63B 21/50* (2013.01); *B63B 35/44* (2013.01); *B63B 39/00* (2013.01); *F03B 13/16* (2013.01); *B63B 1/12* (2013.01); *B63B 21/16* (2013.01); *B63B 2001/123* (2013.01); *B63B 2035/4466* (2013.01); *F05B 2240/40* (2013.01); *F05B 2240/93* (2013.01); *F05B 2250/13* (2013.01); *F05B 2250/14* (2013.01); *Y02E 10/38* (2013.01)

(58) Field of Classification Search
CPC ......... Y02E 10/38; Y02E 10/30; F03B 13/18; F03B 13/16; F05B 2250/13; F05B 2250/14; F05B 2240/40; F05B 2240/93; B63B 1/04; B63B 35/44; B63B 21/50; B63B 39/00; B63B 1/10; B63B 2035/4466; B63B 2001/123; B63B 1/12
USPC .............. 114/230.2, 230.21, 230.22, 230.23, 114/230.24, 230.25, 230.26, 61.1, 61.18, 114/61.15; 60/495, 497, 499, 505; 290/53
See application file for complete search history.

(56) References Cited

U.S. PATENT DOCUMENTS

| | | |
|---|---|---|
| 861,997 A | 7/1907 | Luck |
| 1,448,029 A | 3/1923 | Larry et al. |

(Continued)

FOREIGN PATENT DOCUMENTS

| | | |
|---|---|---|
| AU | 652718 B2 | 2/1991 |
| CN | 1086878 | 5/1994 |

(Continued)

OTHER PUBLICATIONS

Oskar Danielsson, "Design of a Linear Generator for Wave Energy Plant," Master's Thesis—Engineering Physics Programme at Uppsala University School of Engineering, Jan. 22, 2003.

(Continued)

*Primary Examiner* — Anthony D Wiest
(74) *Attorney, Agent, or Firm* — Grossman, Tucker, Perreault & Pfleger, PLLC

(57) ABSTRACT

A hull that is part of a system for producing energy through the action of waves. The hull's shape, dimension and orientation make the system less costly and increase the energy provided by the system.

27 Claims, 11 Drawing Sheets

(56) References Cited

U.S. PATENT DOCUMENTS

| | | | |
|---|---|---|---|
| 1,545,504 A | 7/1925 | Lilley | |
| 2,170,481 A | 8/1939 | Morrison et al. | |
| 3,021,864 A | 2/1962 | Young | |
| 3,173,271 A | 3/1965 | Wittgenstein | |
| 3,204,110 A | 8/1965 | Masuda | |
| 3,717,103 A | 2/1973 | Guderjahn | |
| 3,837,287 A | 9/1974 | Lichtenberg | |
| 3,870,893 A | 3/1975 | Mattera | |
| 4,009,396 A | 2/1977 | Mattera et al. | |
| 4,048,686 A | 9/1977 | Ege | |
| 4,063,430 A | 12/1977 | Lamy | |
| 4,123,667 A | 10/1978 | Decker | |
| 4,132,084 A | 1/1979 | Francisco-Arnold | |
| 4,183,697 A | 1/1980 | Lamy | |
| 4,207,739 A | 6/1980 | Scarpi | |
| 4,260,901 A | 4/1981 | Woodbridge | |
| 4,266,143 A | 5/1981 | Ng | |
| 4,271,550 A | 6/1981 | Joubert et al. | |
| 4,274,757 A | 6/1981 | Francisco-Arnold | |
| 4,332,510 A | 6/1982 | Ferrentino | |
| 4,352,023 A | 9/1982 | Sachs et al. | |
| 4,364,715 A | 12/1982 | Bolding | |
| 4,392,061 A | 7/1983 | Dubois et al. | |
| 4,418,286 A | 11/1983 | Scott | |
| 4,423,334 A | 12/1983 | Jacobi et al. | |
| 4,438,343 A | 3/1984 | Marken | |
| 4,497,173 A | 2/1985 | Gillilan | |
| 4,704,049 A | 11/1987 | Vilain | |
| 4,719,158 A | 1/1988 | Salomon | |
| 4,781,023 A | 11/1988 | Gordon | |
| 5,256,093 A | 10/1993 | Balstad | |
| 5,347,186 A | 9/1994 | Konotchick | |
| 5,552,657 A | 9/1996 | Epstein et al. | |
| 5,710,464 A | 1/1998 | Kao et al. | |
| 5,727,496 A * | 3/1998 | Welch, Jr. | B63B 3/13 114/312 |
| 6,003,458 A * | 12/1999 | Valliere | B63B 1/14 114/61.15 |
| 6,435,126 B1 * | 8/2002 | Burke | 114/363 |
| 6,647,716 B2 | 11/2003 | Boyd | |
| 6,700,217 B1 | 3/2004 | North et al. | |
| 6,831,373 B1 | 12/2004 | Beaston | |
| 7,003,947 B2 | 2/2006 | Kanki | |
| 7,105,939 B2 | 9/2006 | Bednyak | |
| 7,140,180 B2 | 11/2006 | Gerber et al. | |
| 7,239,038 B1 | 7/2007 | Zimmerman et al. | |
| 7,288,860 B2 | 10/2007 | Cheung et al. | |
| 7,339,285 B2 | 3/2008 | Negron Crespo | |
| 7,755,224 B2 | 7/2010 | Beane | |
| 7,989,975 B2 | 8/2011 | Clement et al. | |
| 8,004,105 B2 | 8/2011 | Whittaker et al. | |
| 8,237,304 B2 | 8/2012 | Dehlsen et al. | |
| 8,264,093 B2 | 9/2012 | Moore | |
| 8,519,557 B2 | 8/2013 | Beane | |
| 8,701,403 B2 | 4/2014 | Beane | |
| 8,713,928 B2 | 5/2014 | Gregory | |
| 8,766,470 B2 | 7/2014 | Beane | |
| 8,915,078 B2 | 12/2014 | Beane | |
| 2002/0157398 A1 | 10/2002 | Boyd | |
| 2003/0116971 A1 | 6/2003 | Likitcheva | |
| 2003/0183149 A1 * | 10/2003 | Jessen et al. | 114/125 |
| 2004/0007880 A1 | 1/2004 | French | |
| 2004/0134190 A1 | 7/2004 | Kanki | |
| 2004/0179958 A1 | 9/2004 | Miyake | |
| 2006/0208839 A1 | 9/2006 | Taylor | |
| 2007/0048086 A1 | 3/2007 | Thorsbakken | |
| 2007/0116565 A1 | 5/2007 | Beane | |
| 2007/0137195 A1 | 6/2007 | Tayla et al. | |
| 2007/0228736 A1 | 10/2007 | Smushkovich | |
| 2007/0261404 A1 | 11/2007 | Stewart et al. | |
| 2008/0029014 A1 * | 2/2008 | Giles | 114/289 |
| 2008/0038061 A1 | 2/2008 | Morse | |
| 2008/0224472 A1 | 9/2008 | Bean | |
| 2009/0160191 A1 | 6/2009 | Beane | |
| 2009/0189396 A1 | 7/2009 | Terao | |
| 2009/0309366 A1 | 12/2009 | Moore | |
| 2009/0313988 A1 | 12/2009 | Cassagnol et al. | |
| 2009/0315431 A1 | 12/2009 | Rastegar | |
| 2009/0322080 A1 | 12/2009 | Ruiz Minguela et al. | |
| 2010/0013231 A1 | 1/2010 | Bolin | |
| 2010/0107627 A1 | 5/2010 | Morgan | |
| 2010/0123313 A1 | 5/2010 | Hobdy | |
| 2010/0140942 A1 | 6/2010 | Pitre | |
| 2010/0320759 A1 | 12/2010 | Lightfoot et al. | |
| 2011/0042949 A1 | 2/2011 | Laz et al. | |
| 2011/0089689 A1 | 4/2011 | Gregory | |
| 2011/0158753 A1 | 6/2011 | Ohkubo et al. | |
| 2011/0162572 A1 * | 7/2011 | Chamberlin | B63B 1/107 114/274 |
| 2011/0185719 A1 | 8/2011 | Beane | |
| 2011/0187101 A1 | 8/2011 | Beane | |
| 2011/0304144 A1 | 12/2011 | Dehlsen et al. | |
| 2013/0067903 A1 | 3/2013 | Murtagh et al. | |
| 2013/0319309 A1 | 12/2013 | Beane | |
| 2014/0162509 A1 | 6/2014 | Harrington | |

FOREIGN PATENT DOCUMENTS

| | | | |
|---|---|---|---|
| CN | 1127844 | 7/1996 | |
| CN | 2755302 | 2/2006 | |
| CN | 1761815 | 4/2006 | |
| CN | 201186160 | 1/2009 | |
| CN | 201196138 | 2/2009 | |
| CN | 101460733 | 6/2009 | |
| CN | 101490341 | 7/2009 | |
| CN | 201381930 | 1/2010 | |
| CN | 102171443 | 8/2011 | |
| CN | 202289436 | 7/2012 | |
| DE | 3224894 | 1/1984 | |
| DE | 10241854 | 4/2003 | |
| DE | 102006044563 | 4/2008 | |
| EP | 2171264 | 4/2010 | |
| ES | WO 2011089280 A1 * | 7/2011 | F03B 13/20 |
| FR | 27547 | 7/1924 | |
| FR | 2375463 | 7/1978 | |
| FR | 2480361 | 10/1981 | |
| FR | 2504986 | 11/1982 | |
| FR | 2523654 | 9/1983 | |
| FR | 2911927 | 8/2008 | |
| GB | 1562174 | 3/1980 | |
| JP | S55109771 A | 8/1980 | |
| JP | S5634970 A | 4/1981 | |
| JP | S63255571 A | 10/1988 | |
| JP | 2002339857 | 11/2002 | |
| JP | 2009216076 | 9/2009 | |
| JP | 2011220283 A | 11/2011 | |
| SE | 9402887 | 3/1996 | |
| SU | 587570 | 1/1978 | |
| SU | 1363393 | 12/1987 | |
| WO | WO9100962 | 1/1991 | |
| WO | WO9747516 | 12/1997 | |
| WO | WO 0071891 A1 | 11/2000 | |
| WO | WO200071891 | 11/2000 | |
| WO | WO200223039 | 3/2002 | |
| WO | WO2002061277 | 8/2002 | |
| WO | WO2006040341 | 4/2006 | |
| WO | WO2007056282 | 5/2007 | |
| WO | WO2008000314 | 1/2008 | |
| WO | WO2008006145 | 1/2008 | |
| WO | WO2008122867 | 10/2008 | |
| WO | WO2008149132 | 12/2008 | |
| WO | WO2009013766 | 1/2009 | |
| WO | WO2010034888 | 4/2010 | |
| WO | WO2010071706 | 6/2010 | |
| WO | WO2011089280 | 7/2011 | |
| WO | WO2012018393 | 2/2012 | |

OTHER PUBLICATIONS

AU Patent Examination Report No. 1 dated Apr. 11, 2014 in corresponding Australian Patent Application No. 2009327499.
CA Examination Search Report dated Oct. 27, 2015 in corresponding Canadian Patent Application No. 2,750,850.

(56) References Cited

OTHER PUBLICATIONS

CL Office Action dated May 15, 2014 in corresponding Chilean Patent Application No. 1432-2011. Concise explanation of relevancy provided on p. 2.
CL Office Action dated Jul. 15, 2013 in corresponding Chilean Patent Application No. 1432-2011. Concise explanation of relevancy provided on p. 2.
CN Office Action dated Jan. 15, 2014 in corresponding Chinese Patent Application No. ZL200980156881.3.
CN Office Action dated Jun. 5, 2014 in corresponding Chinese Patent Application No. ZL200980156881.3.
CN Office Action dated Jul. 4, 2013 in corresponding Chinese Patent Application No. ZL200980156881.3.
EP Search Report dated Mar. 28, 2013 in corresponding European Patent Application No. 09833786.8.
EP Examination Report dated Feb. 29, 2016 in corresponding European Patent Application No. 09833786.8.
JP Office Action dated Oct. 8, 2013 in corresponding Japanese Patent Application No. 2011-542158.
KR Office Action dated Mar. 9, 2016 in corresponding Korean Patent Application No. 10-2011-7016250.
KR Office Action dated Sep. 7, 2015 in corresponding Korean Patent Application No. 10-2011-7016250.
MX Office Action dated Oct. 15, 2013 in corresponding Mexican Patent Application No. MX/a/2011/006408.
US Office Action dated Apr. 28, 2011 in corresponding U.S. Appl. No. 12/316,772.
US Office Action dated Nov. 29, 2011 in corresponding U.S. Appl. No. 12/316,772.
International Search Report and Written Opinion dated Apr. 13, 2010 in corresponding PCT Patent Application No. PCT/US09/59531.
PE Office Action dated Sep. 25, 2015 in corresponding Peruvian Patent Application No. 001215-2011. Concise explanation of relevancy provided on p. 2.
AU Patent Examination Report No. 1 dated Jan. 16, 2015 in corresponding Australian Patent Application No. 2011286468.
CL Office Action dated Jan. 11, 2016 in corresponding Chilean Patent Application No. CL 328-2013. Concise explanation of relevancy provided on p. 2.
CL Office Action dated Aug. 7, 2015 in corresponding Chilean Patent Application No. CL 328-2013. Concise explanation of relevancy provided on p. 2.
CN Office Action dated Feb. 28, 2015 in corresponding Chinese Patent Application No. 201180045154.7.
EP Search Report dated Dec. 10, 2015 in corresponding European Patent Application No. 11814908.7.
ID Office Action dated Oct. 6, 2015 in corresponding Indonesian Patent Application No. W00201300905. Concise explanation of relevancy provided on pp. 2-3.
JP Office Action dated Feb. 16, 2016 in corresponding Japanese Patent Application No. 2013-523153.
JP Office Action dated Apr. 28, 2015 in corresponding Japanese Patent Application No. 2013-523153.
MX Office Action dated Mar. 18, 2015 in corresponding Mexican Patent Application No. MX/a/2013/001283.
US Office Action dated Sep. 19, 2012 in corresponding U.S. Appl. No. 12/850,340.
International Search Report and Written Opinion dated Jan. 27, 2012 in corresponding PCT Patent Application No. PCT/US2011/001368.
AU Patent Examination Report No. 1 dated Mar. 5, 2014 in corresponding Australian Patent Application No. 2011286469.
AU Patent Examination Report No. 2 dated May 21, 2015 in corresponding Australian Patent Application No. 2011286469.
AU Patent Examination Report No. 3 dated Aug. 24, 2015 in corresponding Australian Patent Application No. 2011286469.
AU Patent Examination Report No. 4 dated Nov. 27, 2015 in corresponding Australian Patent Application No. 2011286469.
CL Office Action dated Jan. 11, 2016 in corresponding Chilean Patent Application No. CL 327-2011 concise explanation of relevancy provided on p. 2.
CL Office Action dated Aug. 7, 2015 in corresponding Chilean Patent Application No. CL 327-2011 concise explanation of relevancy provided on p. 2.
CN Office Action dated Feb. 28, 2015 in corresponding Chinese Patent Application No. 201180045142.4.
CN Office Action dated Aug. 20, 2015 in corresponding Chinese Patent Application No. 201180045142.4.
EP Search Report dated Jan. 13, 2015 in corresponding European Patent Application No. 11814909.5.
JP Office Action dated Mar. 8, 2016 in corresponding Japanese Patent Application No. 2013-523154.
JP Office Action dated Apr. 28, 2015 in corresponding Japanese Patent Application No. 2013-523154.
MX Office Action dated Mar. 18, 2015 in corresponding Mexican Patent Application No. MX/a/2013/001284.
US Office Action dated Sep. 12, 2012 in corresponding U.S. Appl. No. 12/850,371.
US Office Action dated Nov. 15, 2013 in corresponding U.S. Appl. No. 12/850,371.
US Office Action dated Mar. 20, 2013 in corresponding U.S. Appl. No. 12/850,371.
International Search Report and Written Opinion dated May 30, 2012 in corresponding PCT Patent Application No. PCT/US2011/001369.
AU Patent Examination Report No. 1 dated Jul. 19, 2016 in corresponding Australian Patent Application No. 2013271795.
CN Office Action dated Jun. 2, 2016 in corresponding Chinese Patent Application No. 201380041254.1.
EP Search Report dated Sep. 13, 2016 in corresponding European Patent Application No. 13800503.8.
EP Partial Supplementary Search Report dated Apr. 26, 2016 in corresponding European Patent Application No. 13800503.8.
US Office Action dated Feb. 10, 2015 in corresponding U.S. Appl. No. 13/909,258.
US Office Action dated Mar. 4, 2016 in corresponding U.S. Appl. No. 13/909,258.
US Office Action dated Sep. 15, 2016 in corresponding U.S. Appl. No. 13/909,258.
US Office Action dated Sep. 22, 2015 in corresponding U.S. Appl. No. 13/909,258.
International Search Report and Written Opinion dated Jan. 3, 2014 in corresponding PCT Patent Application No. PCT/US2013/044020.
US Office Action dated Feb. 10, 2016 in corresponding U.S. Appl. No. 14/709,517.
US Office Action dated Sep. 30, 2016 in corresponding U.S. Appl. No. 14/709,517.
International Search Report and Written Opinion dated Jul. 29, 2015 in corresponding PCT Patent Application No. PCT/US2015/030300.
US Office Action dated May 25, 2016 in corresponding U.S. Appl. No. 14/579,090.
International Search Report and Written Opinion dated Mar. 18, 2016 in corresponding PCT Patent Application No. PCT/US15/67497.
CA Examination Search Report dated Sep. 8, 2016 in corresponding Canadian Patent Application No. 2,750,850.
US Office Action dated Feb. 7, 2017 in corresponding U.S. Appl. No. 14/579,090.
CL Written Opinion dated Feb. 14, 2017 in corresponding Chilean Patent Application No. 3305-2014.
AU Patent Examination Report No. 1 dated Sep. 20, 2016 in corresponding Australian Patent Application No. 2015264803.
CN Office Action dated Feb. 21, 2017 in corresponding Chinese Patent Application No. 2013800412541.
MX Office Action dated Feb. 28, 2017 in corresponding Mexican Patent Application No. MX/a/21014/014849.
JP Office Action dated Apr. 4, 2017 in corresponding Japanese Patent Application No. 2015-516106.

(56) References Cited

OTHER PUBLICATIONS

PE Office Action dated Jul. 3, 2017 in corresponding Peruvian Patent Application No. 000168-2013.
CL Office Action dated Aug. 23, 2017 in corresponding Chilean Patent Application No. 3305-2014.
US Office Action dated Aug. 31, 2017 in corresponding U.S. Appl. No. 14/579,090.
CA Office Action dated Jul. 4, 2017 in corresponding Canadian Application No. 2,750,850.
MX Office Action dated Jul. 28, 2017 in corresponding Mexican Application No. MX/a/2014/014849.
PE Office Action dated Sep. 8, 2017 in corresponding Peruvian Application No. 000169-2013.
CN Office Action dated Sep. 19, 2017 in corresponding Chinese Application No. 201380041254.1.
ID Official Action dated Oct. 6, 2017 in corresponding Indonesian Application No. P00201407541.
ID Official Action dated Oct. 4, 2017 in corresponding Indonesian Application No. W00201102521.
EP Official Action dated Sep. 6, 2017 in corresponding European Application No. 13800503.8.

* cited by examiner

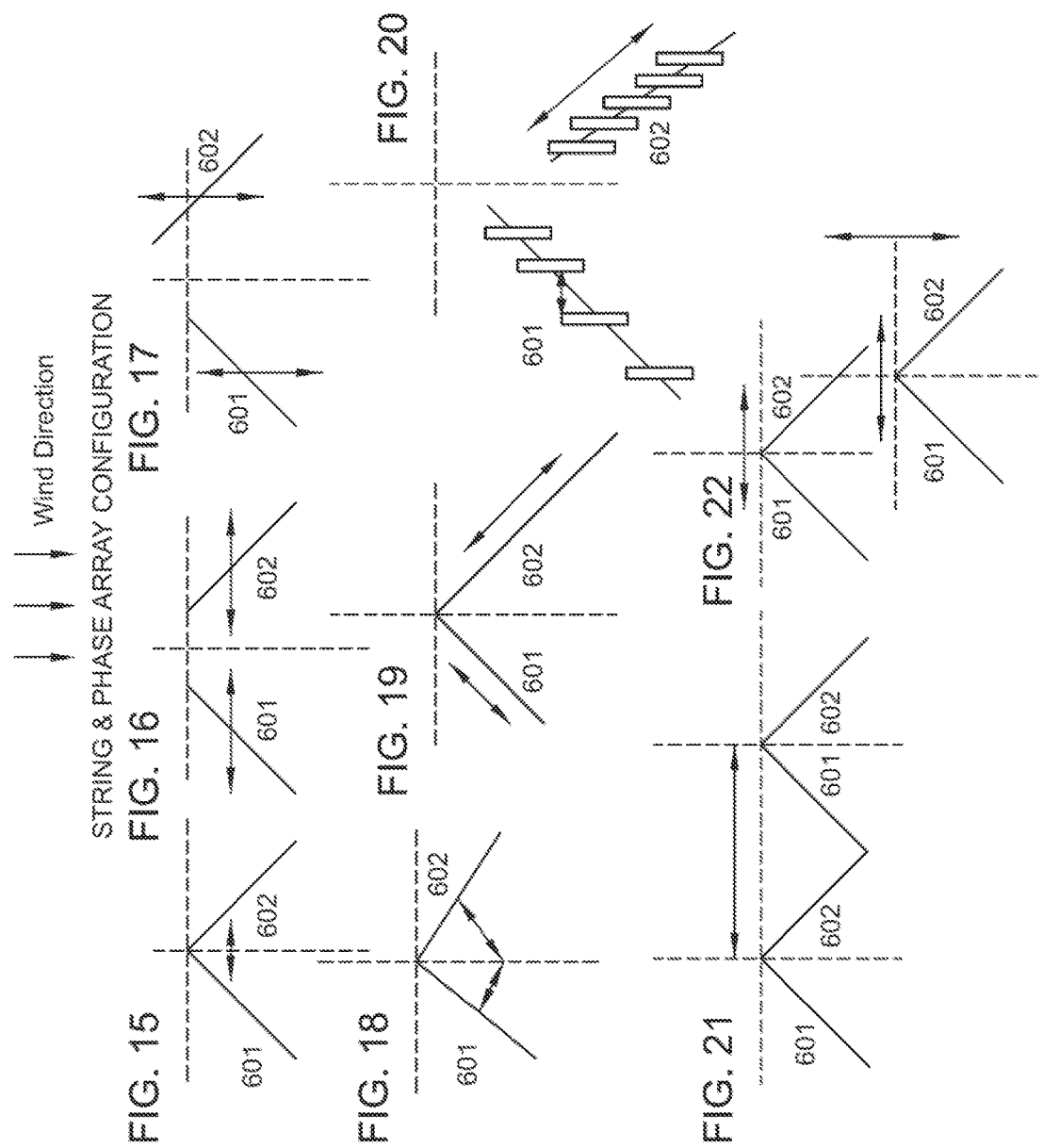

SYSTEM FOR PRODUCING ENERGY THROUGH THE ACTION OF WAVES

CROSS-REFERENCE TO RELATED APPLICATIONS

The present application claims the benefit of Provisional Patent Application Ser. No. 61/655,095 filed Jun. 4, 2012, which is incorporated herein by reference.

FIELD OF THE INVENTION

The present invention relates to a system for producing energy through the action of waves. More particularly, it relates to a ship's hull that constitutes part of, or contains, a system for producing energy through the action of waves.

BACKGROUND OF THE INVENTION

There are numerous examples in the art of systems and methods for producing energy through the action of waves on ships' hulls and other floating platforms (collectively, herein "hulls"). For example, U.S. Patent Publication No. US-2009-0160191-A1, which is incorporated herein by reference, describes a system for producing electricity through the action of waves on a hull. A second movable mass is carried by and movable relative to the hull, a first movable, the second movable mass creates kinetic energy as a result of varying its position relative to the hull. A mechanism then converts the kinetic energy of the second mass moving relative to the first mass into electricity in a preferred embodiment. In this example, the hull is an integral part of the system for producing energy.

In other examples of systems for producing energy through the action of waves, hulls merely carry, or contain, the system, Herein, a hull that is an integral part of a system for producing energy through the action of waves, or merely carries or contains such a system, will be referred to as part of the system for producing energy through the action of waves.

Many parts of these systems for producing energy through the action of waves are described in detail. However, little attention, if any, is paid to hulls that are part of these systems even though the shape, dimension and orientation of the hulls may significantly affect both the costs of producing the systems and the amount of energy provided by the systems.

It is a goal of the present invention to produce hulls to reduce the costs of producing systems for the production of energy through the action of waves and to increase the energy produced by the systems.

SUMMARY OF THE INVENTION

The present invention is hulls that are part of systems for producing energy through the action of waves. The hulls' shapes, dimensions and orientations make the systems less costly and increase the energy produced by the systems.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

These and other features and advantages of the present invention will be better understood by reading the following detailed description of embodiments, taken together with the drawings wherein:

FIG. 15 is a schematic view of one embodiment of a phase array;

FIG. 16 is a schematic view of another embodiment of a phase array;

FIG. 17 is a schematic view of another embodiment of a phase array;

FIG. 18 is a schematic view of another embodiment of a phase array;

FIG. 19 is a schematic view of another embodiment of a phase array;

FIG. 20 is a schematic view of another embodiment of a phase array;

FIG. 21 is a schematic view of another embodiment of a phase array; and

FIG. 22 is a schematic view of another embodiment of a phase array.

DETAILED DESCRIPTION OF EMBODIMENTS

The present invention is a hull constituting part of a system for producing energy through the action of waves. The other parts of the system may be parts of the system described in U.S. Patent Publication US-2009-0160191-A1 or any other system for producing energy through the action of waves.

Figures 1, 2:
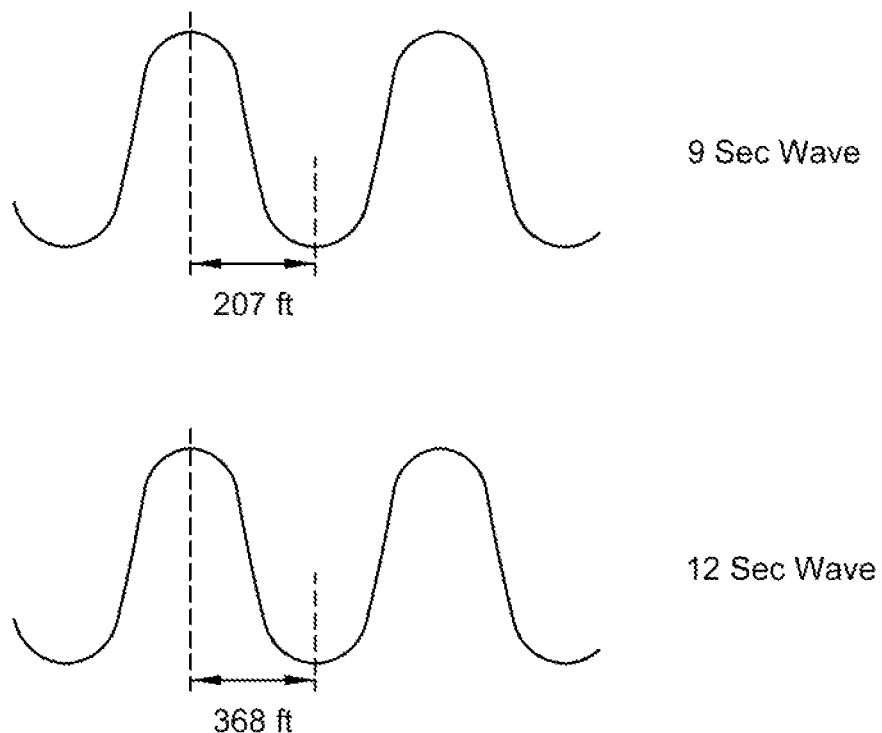
FIG. 1 is a schematic view of wave periods.
FIG. 2 is a table showing wave lengths and wave frequencies.

A preferred embodiment of the present invention is designed to reduce manufacturing costs. Ocean waves can be divided into two groups based on their frequencies: one group contains waves with frequencies centered around 9 sec. (medium frequency) and one group contains waves with frequencies centered around 12 sec. (long frequency). As shown in FIG. 1, a 9 sec. wave has a one-half wavelength, the distance from a peak to an adjacent trough of 207 ft. and a 12 sec. wave has a one-half wavelength of 368 ft. The optimum length of a hull is between one-quarter and three-quarters of a wavelength. Here, as shown in FIG. 2, the optimum length of a hull to be used for both 9 sec. and 12 sec. waves would be longer than one-quarter of a wavelength of a 12 sec. or long wave, 184 ft., and shorter than three-quarters of a wavelength of a 9 sec. or medium wave, 311 ft. A preferred embodiment has a hull length of between 200 and 280 feet.

Figure 3:
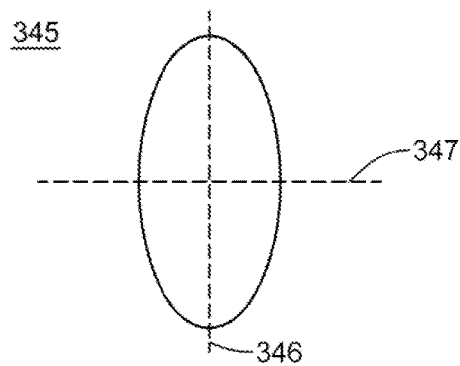
FIG. 3 is a cross-section of a hull.

As shown in FIG. 3, a cross-section 345 of a hull in another preferred embodiment is an ellipse having a cross-section with a long axis that is vertical 346 of 75 ft. and a short axis that is horizontal 349 of 53 ft. The curved walls of the ellipse cause it to have greater strength than structures with straight sections of wall. This, in turn, allows the use of thinner, less expensive walls.

Figure 3A:
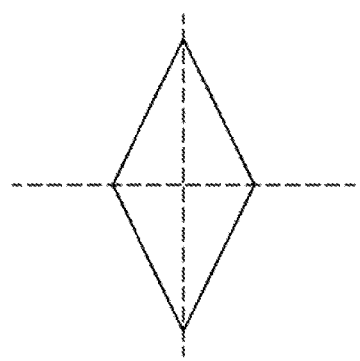
FIG. 3A is a cross-section of a hull.
Figure 4:
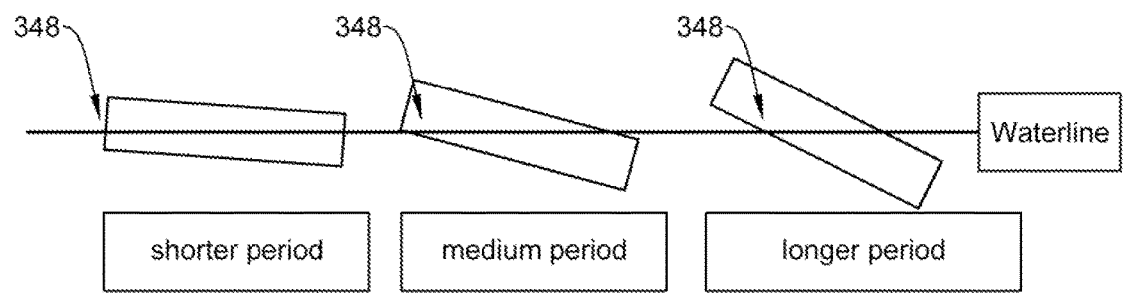
FIG. 4 is a schematic view of a water plane.
Figure 5:
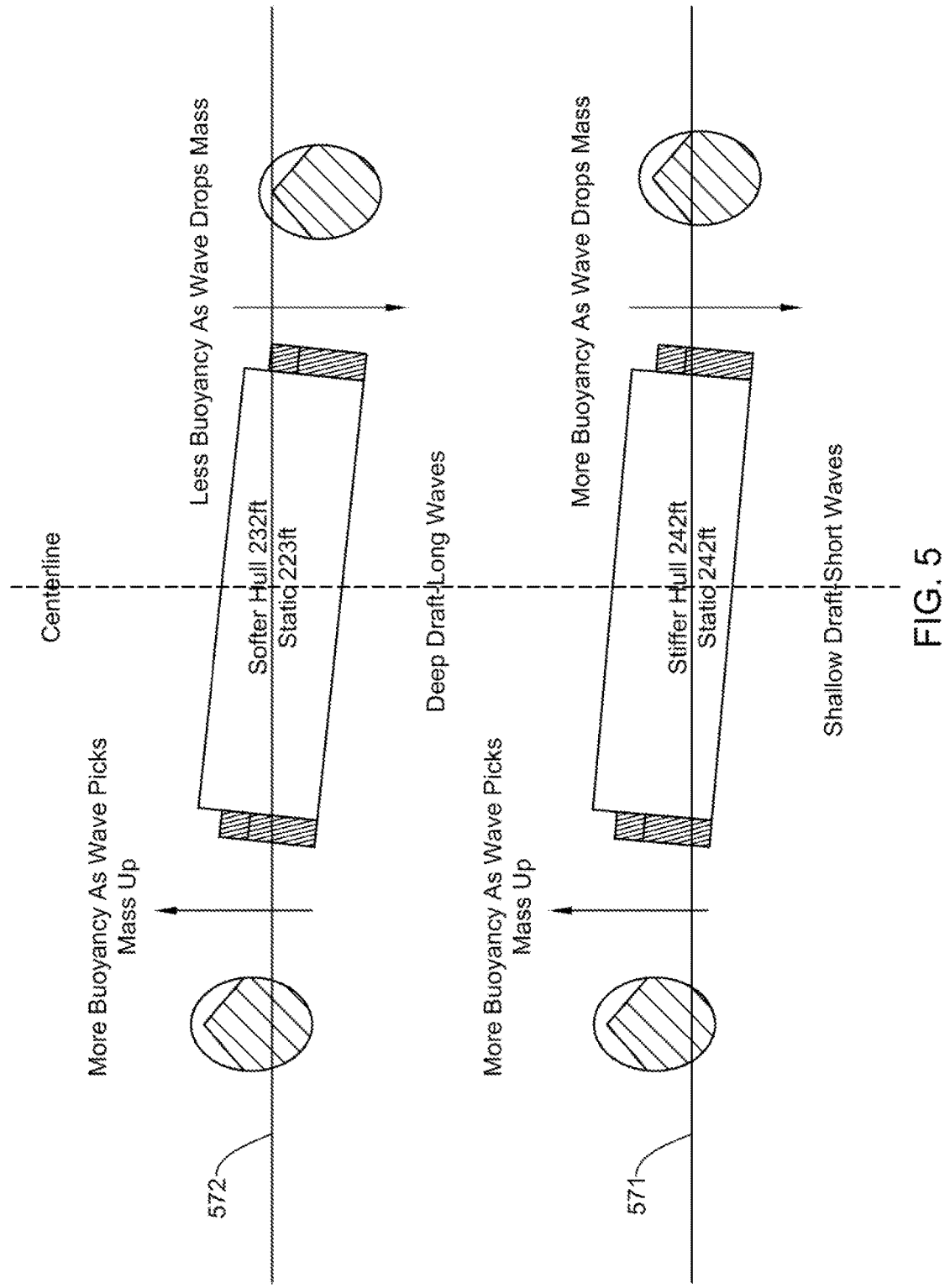
FIG. 5 is a schematic view of tuned elliptical hulls.

In addition, this elliptical shape is optimized for displacement and water plane to be self-tuning to multiple wave frequencies ranging from 7 sec. to 15 sec. Other cross-section geometries, such as a diamond shape, as shown in FIG. 3A, that are similar to an ellipse in increasing or decreasing waterplane as the hull pitches or heaves can also be used. The elliptical geometry of the hull is used to tune the phase of the hull to wave lengths via changes to the waterplane, which is the plane formed by the intersection of the hull and the waterline, as shown in FIG. 4. As shown in FIG. 5, as the waterplane of the ellipse increases or decreases for a given moment of inertia, the hull becomes stiffer or softer, tuning it to higher or lower frequency waves. As the waterplane increases and the hull becomes stiffer 571, it is tuned to higher frequency waves, and as the waterplane decreases and the hull becomes softer 572, it is tuned to lower frequency waves as it pitches and heaves.

The draft of the ellipse determines the static waterplane of the hull. As the draft increases, the waterline rides higher on the ellipse 572, which then has a smaller waterplane, which softens the hull. As the draft decreases and the waterline rides closer to the geometric horizontal centerline of the ellipse 571, the waterplane of the hull increases, which stiffens the hull.

In addition, as the moment of inertia of a hull increases, the hull can be tuned to longer and longer wave frequencies. By adding mass externally at the bow or stern of the hull, the moment of inertia of the hull increases without adding additional volume to the hull. The relocation of the additional mass is much less expensive than adding volume to the hull to accommodate more mass needed to create a similar moment of inertia if the mass were added within the hull.

The addition or subtraction of additional mass, located externally at the bow and stern of the hull, also increases or decreases the displacement of the hull, which, in turn, increases or decreases the moment of inertia of the hull, without adding volume to the hull, which, in turn, tunes the phase of the hull to longer or shorter wave periods, respectively.

Figure 5A:
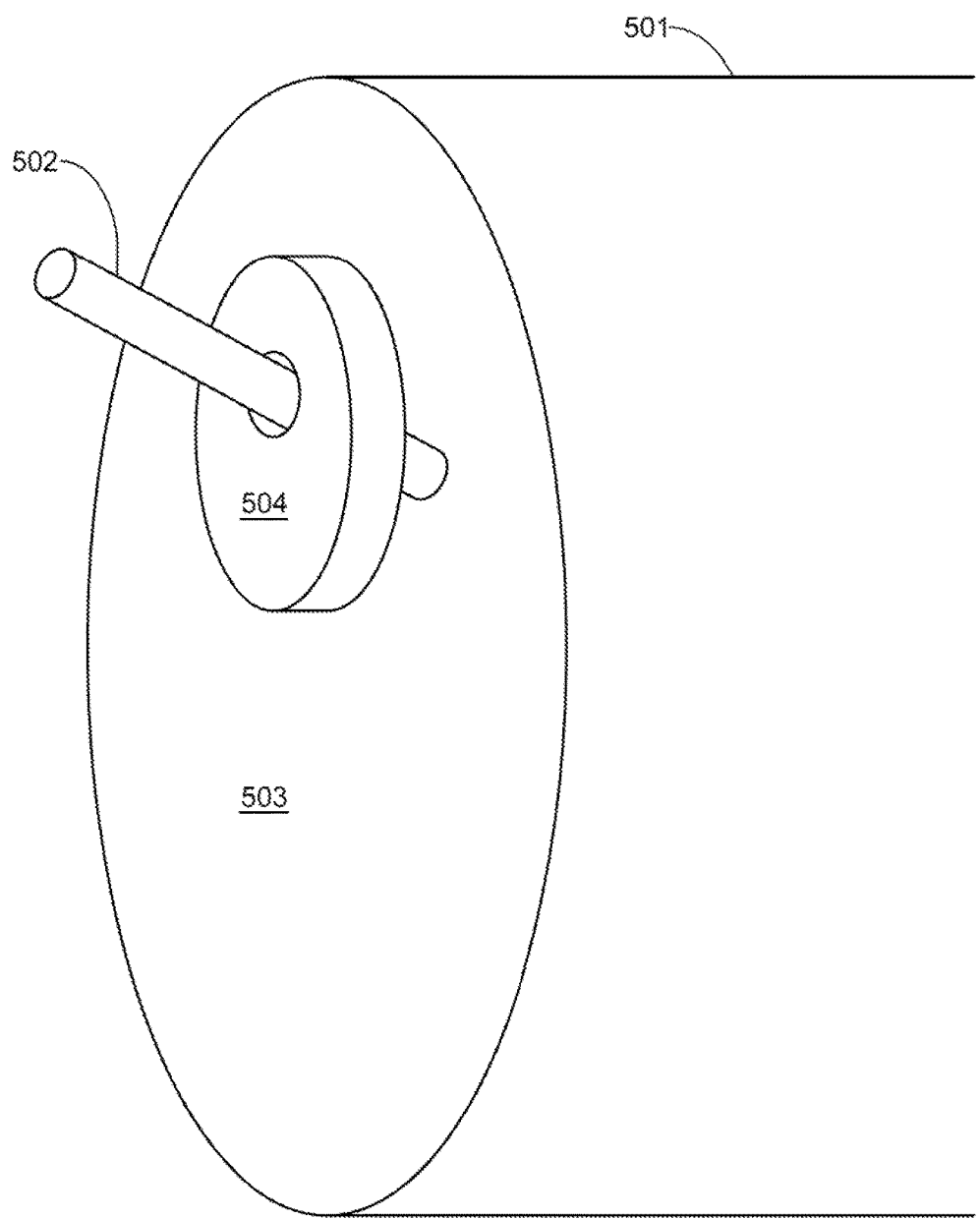
FIG. 5A is a schematic view of a hull with external ballast retaining means.

In another preferred embodiment, as shown in FIG. 5A, a hull 501 has an external ballast retaining means 502 at its bow 503, which can also be at its stern (not shown). The ballast retaining means can consist of a hook 502 for hanging modular ballast 504 such as blocks of concrete or sheets of metal or cages into which such ballast can be placed, or other retaining means known to those skilled in the art. The modular ballast is added to, or subtracted from, the ballast retaining means. The addition or subtraction of such ballast increases or decreases hull length, displacement and moment of inertia, respectively, to tune the phase of the hull to operate in phase with higher frequency or lower frequency waves and increase power generation.

Figure 6:
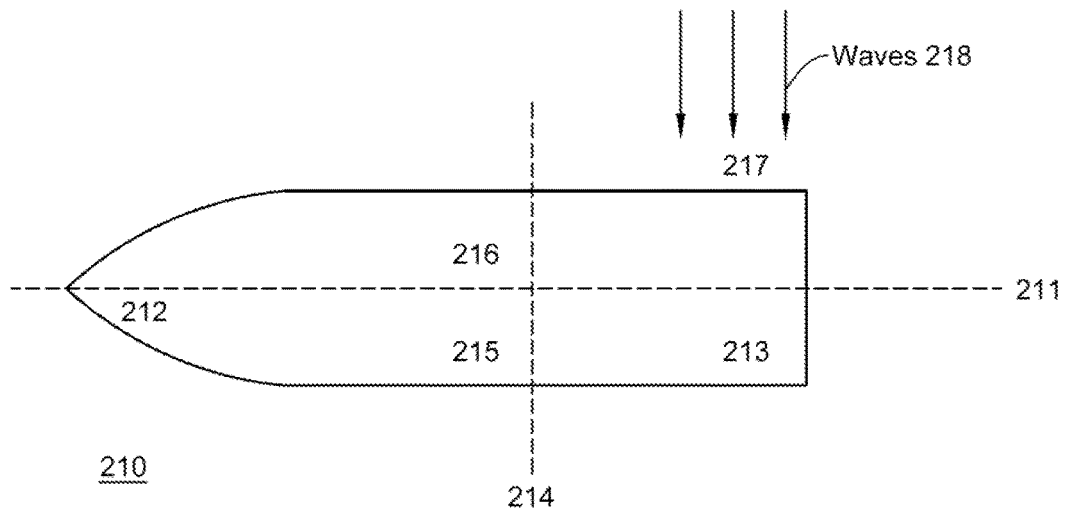
FIG. 6 is a schematic view of the orientation of a single hull.

A typical hull 210, as shown in FIG. 6, has a greater moment of inertia along the line 211 from bow 212 to stern 213 than the moment of inertia along the line 214 from port 215 to starboard 216. This will result in the hull turning so that the line 211 from bow 212 to stern 213 is perpendicular to the direction 217 of the waves 218, causing the hull to roll from port to starboard. It should be noted that, as used herein, the direction of the wind is parallel to the direction of the waves and perpendicular to the wavefront.

Figure 7:
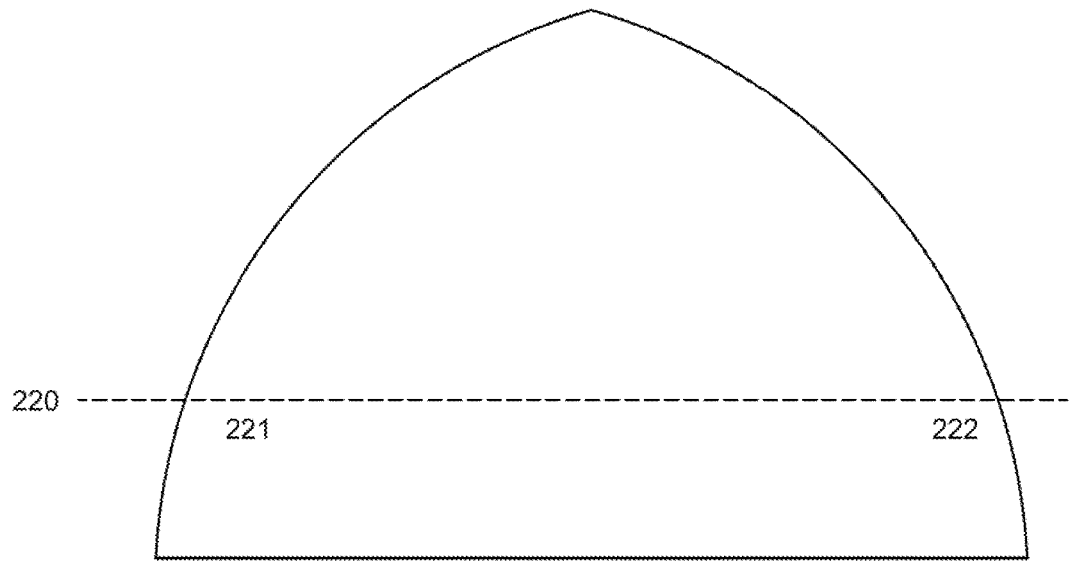
FIG. 7 is a schematic view of the orientation of another single hull.

In order to build a hull that will orient itself so that the line from bow to stern is parallel to the direction of the waves, the moment of inertia along the line from port to starboard must be increased so that it is greater than the moment of inertia along the line from bow to stern. This has been done in the prior art by increasing the dimension of the hull along the line 220 from port 221 to starboard 222, as shown in FIG. 7. However, the cost of materials for such a hull and the cost of manufacturing and transporting it are significant.

Figure 8:
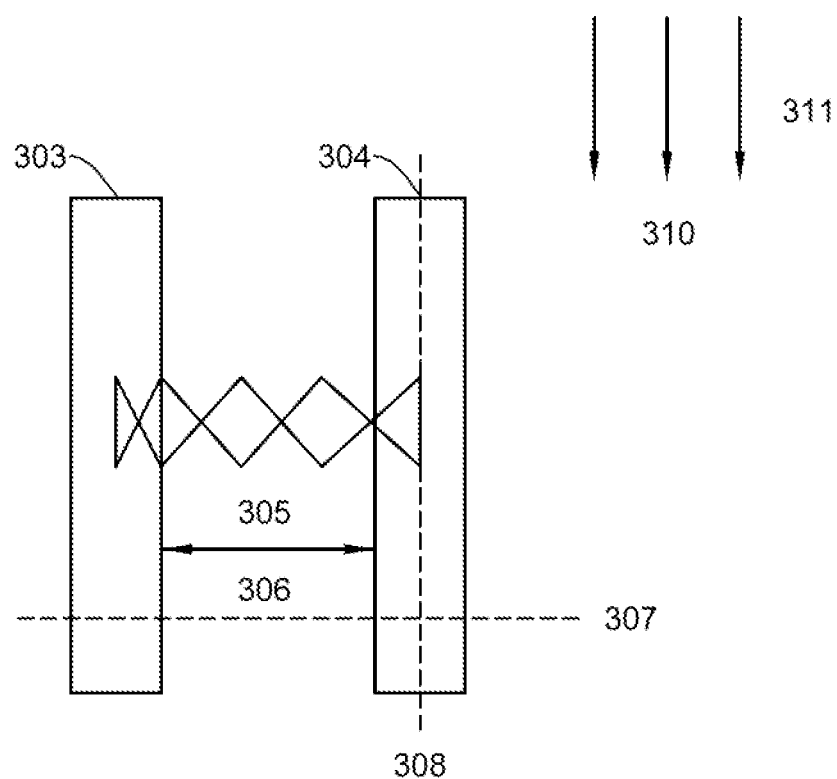
FIG. 8 is a schematic view of the orientation of multiple hulls connected by trusses.

In a preferred embodiment, as shown in FIG. 8, multiple hulls (here two but more than two can be used) 303, 304 are held in position parallel to each other by simple trusses 305. The trusses hold the hulls apart such that the first hull is closest to the second hull between the starboard side of the first hull and the port side of the second hull. The distance between the hulls 306 is chosen, in part, so that the moment of inertia along the line 307 from the port side of the left-most hull to the starboard side of the right-most hull exceeds the moment of inertia along the line 308 from the bow to the stern of a hull. This will result in the multiple hulls structure orienting itself so the line 308 from bow to stern is parallel to the direction 310 of the waves 311.

Figure 9:
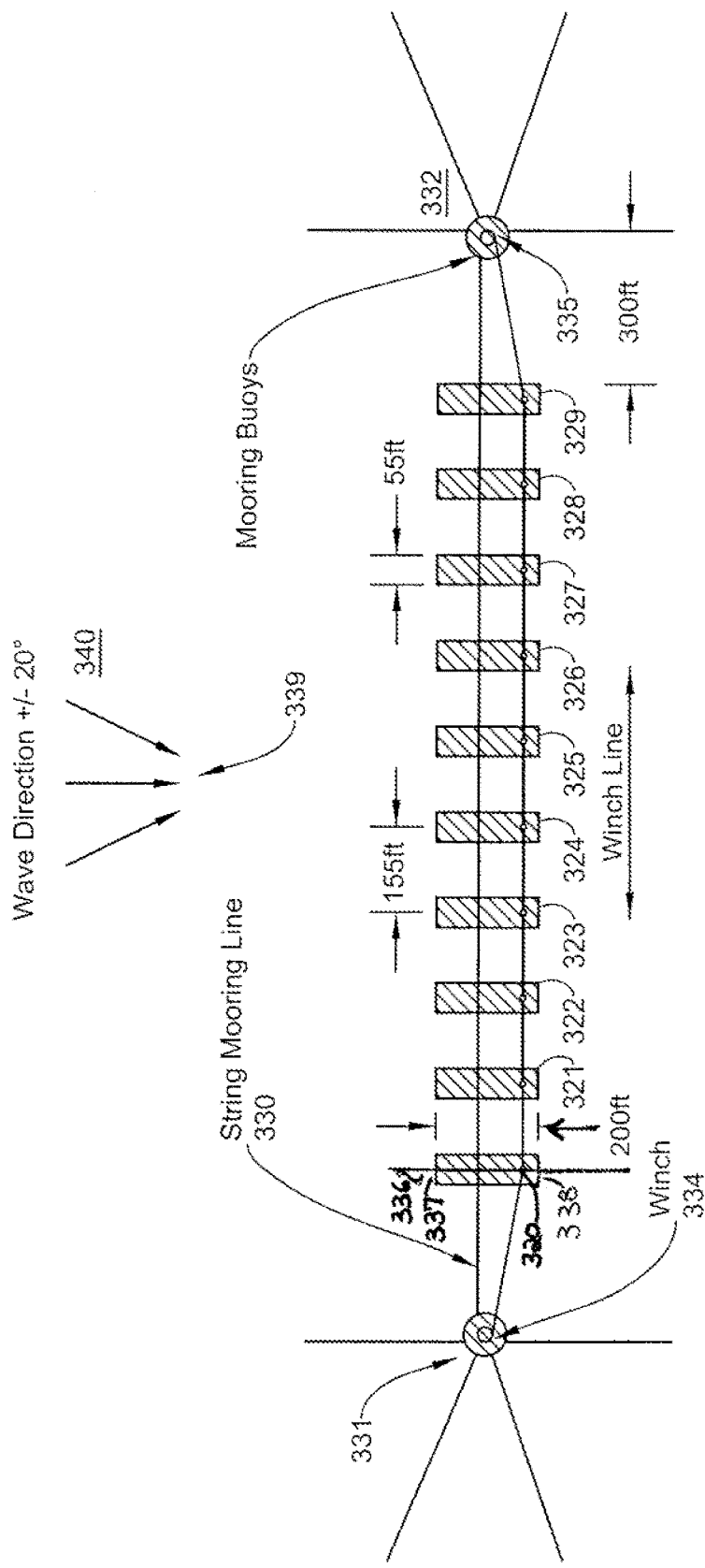
FIG. 9 is a schematic view of the orientation of multiple hulls connected to a stationary mooring line and a winch line.
Figure 10:
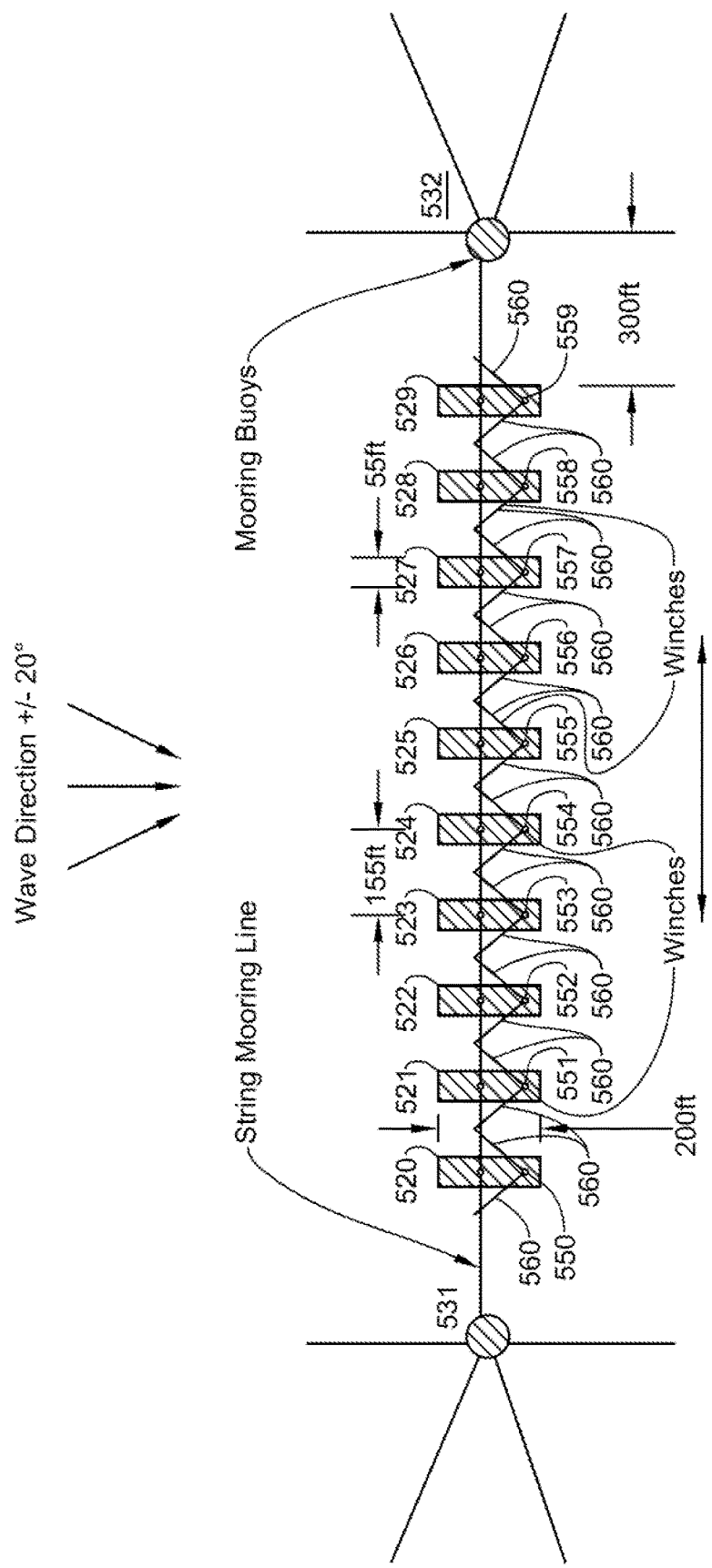
FIG. 10 is a schematic view of the orientation of multiple hulls connected to a stationary mooring line and multiple winch lines.

In another preferred embodiment, as shown in FIG. 9, multiple hulls 320-329 are attached to a stationary mooring, which can be either a mooring line 330 with ends attached to buoys 331 and 332 or individual stationary moorings for each hull (not shown). The multiple hulls 320-329 are also attached to a winch line 333 with ends attached to winches 334 and 335 in buoys 331, 332. As waves change direction, the winches 334 and 335, by moving the winch line from one winch to the other, actively orient the hulls to the wave direction so that the line 336 from the stern 338 to the bow 337 of a hull, or the direction in which the hull is headed, is parallel to the direction 339 of a wave 340. A string mooring, excluding the active winch line, can also be used to moor hulls with trusses, as described above, that are self-orienting. In another embodiment, as shown in FIG. 10, multiple hulls 520-529 are attached to a stationary mooring, which can be either a mooring line 530 with ends attached to buoys 531-532 or an individual stationary mooring for each hull (not shown). A winch 540-549 can be attached to each individual 520-529 hull with winch lines 560 having one end attached to the winch and one end attached to the stationary mooring. Each hull winch 540-549, by moving an individual winch line 550-568, can actively orient each individual hull 520-529 so that the line from the stern to the bow of the hull, or the direction in which the hull is headed, is parallel to the direction of a wave.

Figure 11:
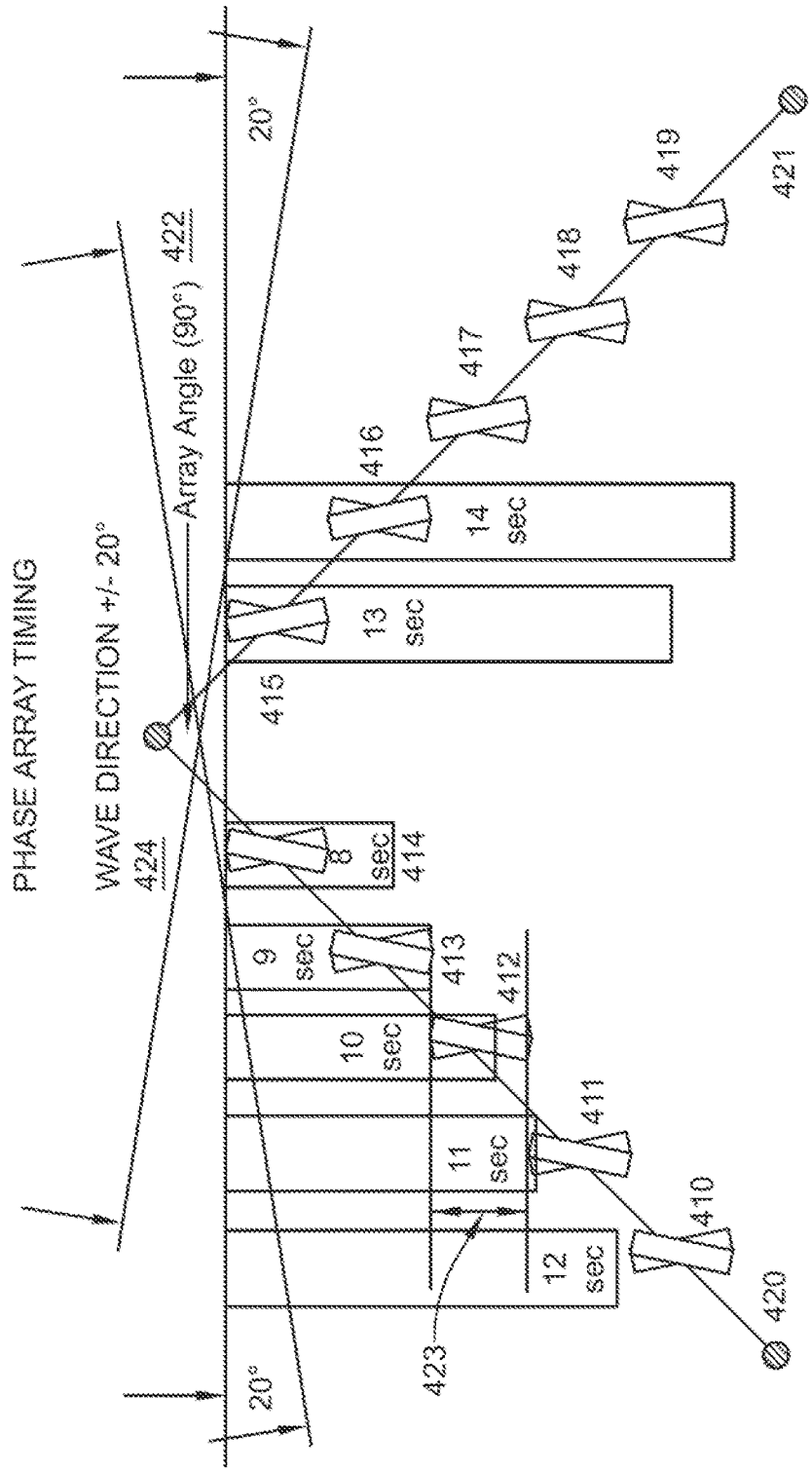
FIG. 11 is a schematic view of a phase array of multiple hulls.

In another preferred embodiment, multiple hulls that are part of a system to produce electricity through the action of waves are arranged in a phase array as shown in FIG. 11. The purpose of the phase array is to address the problem of the intermittent nature or granularity, as described below, of the electricity produced by one or more independent hulls.

Figure 12:
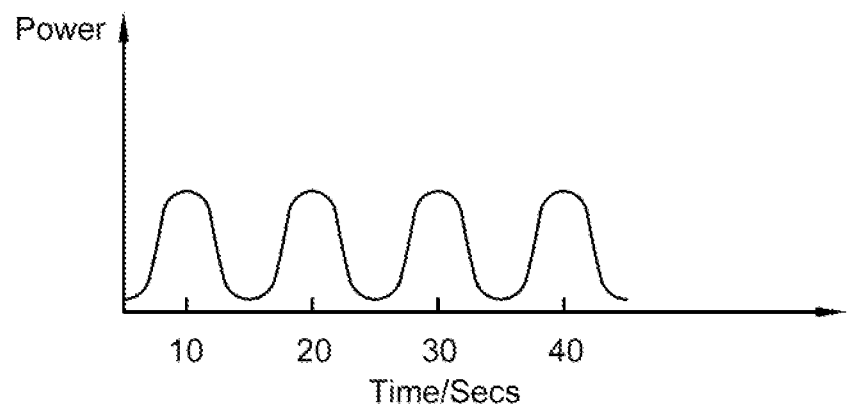
FIG. 12 is a graph of power produced versus time for a single hull.

With one hull, electricity is produced while a wave is acting on the hull. However, no electricity is produced during the period from one wave ceasing to act on the hull to the next wave beginning to act on the hull. The electricity produced is granular, as shown in FIG. 12, for waves with peaks 10 secs. apart. Such granular electricity cannot be transmitted directly to commercial electric grids but must be stored in batteries or other costly storage devices, adding to the expense of producing the electricity.

Figure 13:
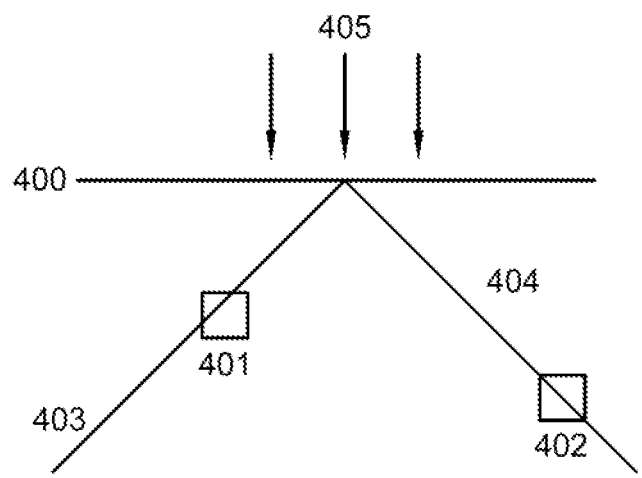
FIG. 13 is a schematic view of a phase array of two hulls.
Figure 14:
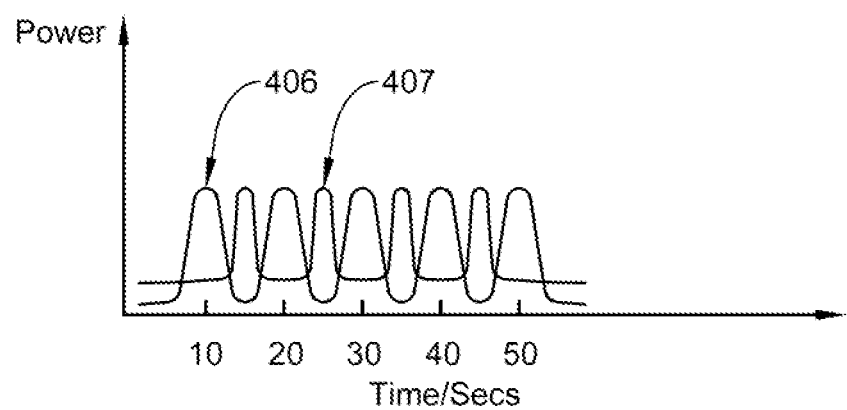
FIG. 14 is a graph of power produced versus time for two hulls.

The solution is to orient multiple hulls so that the peak of a first wave in a series of waves is acting on a second when the peak of a second wave is not acting on the first hull. For example, if two hulls 401, 402 are moored by mooring lines 403, 404 in a phase array 400, as shown in FIG. 13, the peak of a wave in a series of waves traveling in direction 405 with peaks 10 secs. apart acts on hull 401 first and 5 seconds later on hull 402. In this phase array, as shown in FIG. 14, the granularity of electricity 406 produced, which is a combination of the electricity produced by hulls 401 and the electricity produced by hull 402, begins to be smoothed out. With a larger number of hulls arrayed appropriately the aggregate total of the electricity produced by all the hulls loses its graininess and the need for costly storage devices goes away.

In another preferred embodiment, shown in FIG. 11, multiple hulls 410-419 are attached to mooring lines 420, 421, the ends of which form a right array angle 422 to form phase array 424. The phase array allows the hulls 410-419 to be moved so that waves of different frequencies or waves coming from different directions, in this embodiment +/−20°, will still produce electricity from hulls 410-419 that is not granular. For example, if the time between wave peaks increases, the distance 423 from the bow of one hull 411 to the bow of another hull 412 can be increased by moving the hulls apart on mooring line 420. Also, the array angle 402 can be decreased, in effect increasing the distance from the bow of one hull to the bow of another hull.

Other mooring line configurations in other phase arrays are shown in FIGS. 15-22 as examples. In FIG. 15 the ends of the mooring lines 601, 602 form a 90° angle, which can be increased or decreased to change the distance between the bow of one hull on one of the mooring lines to the bow of another such hull. In FIG. 16, the mooring lines 601, 602 do not intersect so they can be moved perpendicular to the direction of the wind to take into account changes in wind direction. In FIG. 17, the mooring lines 601, 602 do not intersect so that one or both can be moved parallel to the general direction of the wind.

In FIG. 18 the mooring lines 601, 602 each form a different angle with a line parallel to the general direction of the wind. Each of those angles can be increased or decreased. In FIG. 19 the mooring lines 601, 602 are of different lengths. The lengths of each of the mooring lines can be increased or decreased. In. FIG. 20, the hulls along one mooring line 601 can be spaced apart or the entire mooring line can be moved.

In FIG. 21 there are multiple phase arrays. Each one consists of two mooring lines 601, 602 with ends meeting at a 90° angle. The phase arrays can be moved closer together or further apart in the direction perpendicular to the general direction of the wind. In FIG. 22, there are multiple phase arrays. Again, each one consists of two mooring lines 601, 602 with ends meeting at a 90° angle. The phase arrays can be moved closer together or further apart in the direction parallel to the general direction of the wind.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system for producing energy through the action of waves comprising,
   a hull having a bow and stern, wherein at least a portion of the hull has a cross-section such that a static waterplane of the hull increases or decreases as a draft of the hull decreases or increases, respectively;
   at least one system to produce electricity from the action of waves and resulting pitching movement of the hull, wherein at least a portion of the at least one system is secured to the hull; and
   a system to tune the pitching of the hull relative to hydraulic forces of the waves to increase energy generated by the system to produce electricity, wherein:
      in response to the frequency of the wave decreasing and a wave period increasing, the system to tune is configured to cause the draft of the hull to increase and the static waterplane of the hull to decrease; and
      in response to the frequency of the wave increasing and the wave period decreasing, the system to tune is configured to cause the draft of the hull to decrease and the static waterplane of the hull to increase.

2. The system for producing energy through the action of waves of claim 1, wherein the hull has an elliptical cross-section having a long axis and a short axis wherein the long axis is vertical and the short axis is horizontal.

3. The system for producing energy through the action of waves of claim 1, wherein the system to tune the hull comprises a controller and one or more sensors configured output a signal representative of the wave height.

4. The system for producing energy through the action of waves of claim 1, wherein the hull has a generally diamond shaped cross-section.

5. The system for producing energy through the action of waves of claim 1, wherein the hull has a length extending between the bow and the stern and the length of the hull is between 200 and 280 feet.

6. The system for producing energy through the action of waves of claim 1, wherein the hull has a length extending between the bow and the stern that is between one quarter and three quarters of a length of the wave frequency.

7. The system for producing energy through the action of waves of claim 1, further comprising:
   a bow external modular ballast;
   a stern external modular ballast; and
   an external bow ballast hanger and an external stern ballast hanger disposed at the bow and the stern for retaining the bow and the stern external modular ballast, respectively.

8. A system for producing energy through the action of waves comprising,
   a hull having a bow and stern, wherein at least a portion of the hull has a cross-section such that a static waterplane of the hull increases or decreases as a draft of the hull decreases or increases, respectively;
   a generator secured to the hull, the generator to produce electricity from a pitching movement of the hull induced by the action of waves;
   a controller to monitor wave frequency and to tune the pitching of the hull relative to hydraulic forces of the waves to increase electricity generated by the generator, wherein:
      in response to the frequency of the wave decreasing and a wave period increasing, the controller is configured to cause the draft of the hull to increase such that a static waterplane of the hull decreases; and in response to the frequency of the wave increasing and the wave period decreasing, the controller is configured to cause the draft of the hull to decrease such that the static waterplane of the hull increases.

9. The system for producing energy through the action of waves of claim 8, wherein the hull has an elliptical cross-section having a long axis and a short axis wherein the long axis is vertical and the short axis is horizontal.

10. The system for producing energy through the action of waves of claim 8, wherein the hull has a generally diamond shaped cross-section.

11. The system for producing energy through the action of waves of claim 8, wherein the hull has a length extending between the bow and the stern and the length of the hull is between 200 and 280 feet.

12. The system for producing energy through the action of waves of claim 8, wherein the hull has a length extending between the bow and the stern that is between one quarter and three quarters of a length of the wave frequency.

13. The system for producing energy through the action of waves of claim 8, further comprising an external bow ballast hanger and an external stern ballast hanger disposed at the bow and the stern for retaining a bow and a stern external modular ballast, respectively.

14. A system for producing energy through the action of waves comprising,
a hull having a bow and stern, wherein a top portion of the hull has a cross-section that decreases as a draft of the hull increases;
an electrical generator secured to the hull to produce electricity from a pitching movement of the hull induced by the action of waves;
a controller to monitor wave frequency and to tune the pitching of the hull relative to hydraulic forces of the waves to increase electricity generated by the electrical generator, wherein:
in response to the frequency of the wave decreasing and a wave period increasing, the controller is configured to cause the draft of the hull to increase such that a static waterplane of the hull decreases; and
in response to the frequency of the wave increasing and the wave period decreasing, the controller is configured to cause the draft of the hull to decrease such that the static waterplane of the hull increases.

15. The system for producing energy through the action of waves of claim 14, wherein the hull has an elliptical cross-section having a long axis and a short axis wherein the long axis is vertical and the short axis is horizontal.

16. The system for producing energy through the action of waves of claim 14, wherein the hull has a generally diamond shaped cross-section.

17. The system for producing energy through the action of waves of claim 14, wherein the hull has a length extending between the bow and the stern and the length of the hull is between 200 and 280 feet.

18. The system for producing energy through the action of waves of claim 14, wherein the hull has a length extending between the bow and the stern that is between one quarter and three quarters of a length of the wave frequency.

19. The system for producing energy through the action of waves of claim 14, further comprising an external bow ballast hanger and an external stern ballast hanger disposed at the bow and the stern for retaining a bow and a stern external modular ballast, respectively.

20. The system for producing energy through the action of waves of claim 19, further comprising the bow and the stern external modular ballast.

21. A method for producing energy through the action of waves on a hull, the method comprising:
adjusting the pitching motion of the hull by adjusting an amount of ballast of the hull to adjust a draft of the hull based on, at least in part, a frequency of the waves, at least a portion of the hull having a cross-section such that a static waterplane of the hull increases or decreases as a draft of the hull decreases or increases, respectively, wherein adjusting the pitching motion of the hull by adjusting the amount of ballast of the hull comprises:
increasing the draft of the hull and decreasing the static waterplane of the hull in response to the frequency of the wave decreasing; and
decreasing the draft of the hull and increasing the static waterplane of the hull in response to the frequency of the wave increasing; and
generating electricity from the action of waves and resulting pitching movement of the hull.

22. The method of claim 21, wherein the hull has a length that is between one quarter and three quarters of a wave length.

23. The method of claim 21, further comprising adjusting an amount of ballast to alter a moment of inertia of the hull and to tune a phase of the hull to operate in phase with the frequency of the waves.

24. The method for producing energy through the action of waves of claim 21, wherein the hull has an elliptical cross-section having a long axis and a short axis wherein the long axis is vertical and the short axis is horizontal.

25. The method for producing energy through the action of waves of claim 21, wherein the hull has a generally diamond shaped cross-section.

26. The method for producing energy through the action of waves of claim 21, wherein the hull has a length of between 200 and 280 feet.

27. The method for producing energy through the action of waves of claim 21, wherein generating electricity from the action of waves and resulting movement of the hull comprises:
moving a second movable mass that is carried by relative to a first movable mass to create kinetic energy as a result of varying its position relative to the first movable mass, wherein the first movable mass is the hull; and
converting the kinetic energy of the second mass moving relative to the first mass into electricity.

* * * * *